N. C. CHRISTENSEN.
PROCESS OF TREATING ORES CONTAINING GALENA.
APPLICATION FILED APR. 9, 1920.
1,434,087.
Patented Oct. 31, 1922.
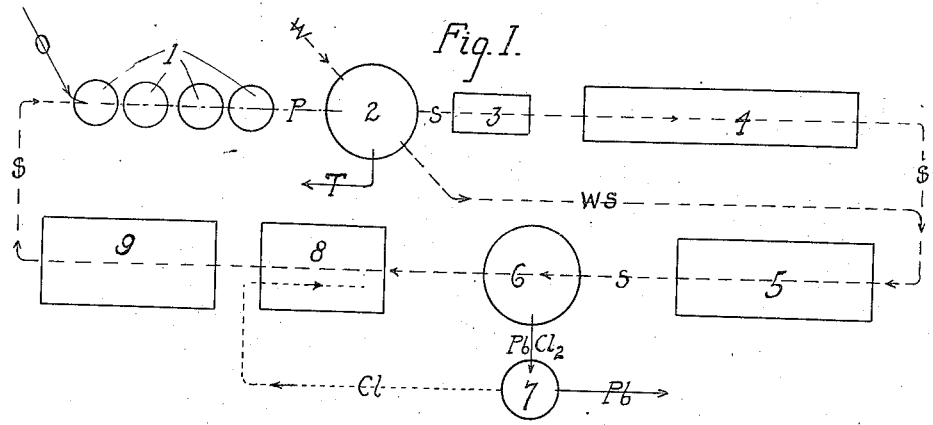
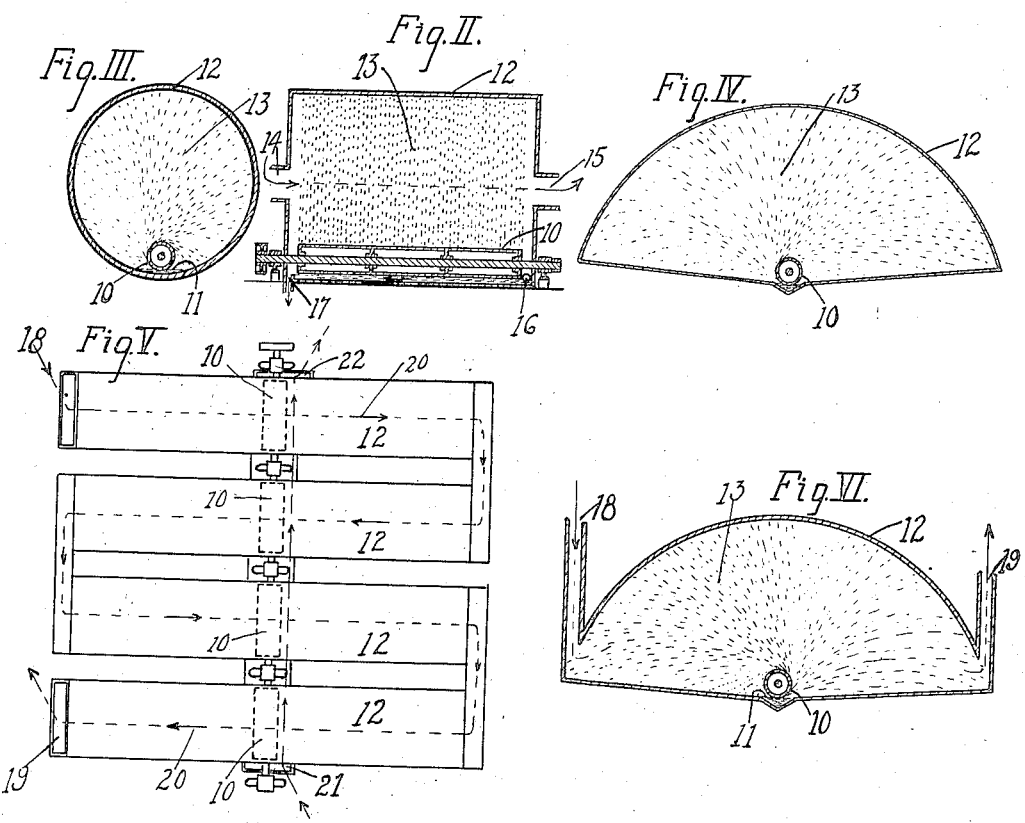
INVENTOR
Niels C. Christensen
BY
ATTORNEYS.

Patented Oct. 31, 1922.

1,434,087

UNITED STATES PATENT OFFICE.

NIELS C. CHRISTENSEN, OF SALT LAKE CITY, UTAH.

PROCESS OF TREATING ORES CONTAINING GALENA.

Original application filed September 30, 1919, Serial No. 327,401. Divided and this application filed April 9, 1920. Serial No. 372,689.

*To all whom it may concern:*

Be it known that I, NIELS C. CHRISTENSEN, a citizen of the United States, residing at Salt Lake City, in the county of Salt Lake and State of Utah, have invented certain new and useful Processes of Treating Ores Containing Galena, of which the following is a specification.

This invention relates to the treatment of ores containing galena for the recovery of the lead and silver therefrom. My process is applicable to all galena ores which do not contain too much readily soluble material such as calcite. It recovers practically all the lead and silver in the galena and also the silver not held by the galena if it is in the form of sulphide or antimonide. The sulphur of the galena is also recovered in a form which is readily handled.

My process consists in treating the finely ground galena with a concentrated salt solution containing ferric chloride. I have found that a relatively concentrated solution of sodium chloride or calcium chloride containing ferric chloride acts on the galena, dissolving the lead and silver and freeing the sulphur. The cold solution acts slowly and holds a comparatively small amount of lead but a hot solution acts very rapidly and holds a relatively large amount of lead. The lead and silver go into solution as chlorides and the sulphur is separated as free sulphur. The reaction is indicated below:

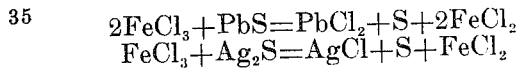

As shown by the above equations, in dissolving the lead (and silver) the ferric chloride is reduced to ferrous chloride. This ferrous chloride must be changed to ferric chloride again before the solution can be used for the treatment of more ore. This is best done by the addition of chlorine as shown:

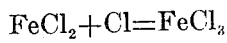

I bring about this change from ferrous to ferric iron by electrolyzing the lead chloride to secure lead and chlorine, and using this chlorine to change the iron from ferrous to ferric chloride. This may be done by electrolyzing the molten $PbCl_2$ and passing the chlorine into the ferrous chloride solution or by electrolyzing the $PbCl_2$ in the salt solution, the ferrous iron being changed to ferric at the anode. This operation should preferably be carried out in a cell with a diaphragm between the anode and cathode compartments to prevent the reduction of the ferric iron to the ferrous condition at the cathode. The lead chloride is added to the cathode compartment and the ferrous chloride solution to the anode compartment and the lead removed as lead sponge and the ferrous solution changed to ferric.

Either ferric chloride or ferric sulphate may be used as the ferric sulphate is changed to the chloride in the salt solution.

The hot salt solution holds a great deal more lead in solution than the cold solution, and in my preferred method of treatment I take advantage of this to separate the lead chloride from solution, the ore being treated with a hot solution to dissolve the galena, and this hot solution then separated from the ore and cooled, and the precipitated lead chloride separated from the cold solution. The difference in solubility of the lead chloride in the hot and cold solution is indicated by the curve in my patent application No. 327,400 also on the treatment of galena ores.

My preferred method of carrying out my process is as follows: The comminuted ore is agitated for from a short time (from 10–30 minutes or more according to the fineness of grinding, etc.) with hot salt solution containing over the amount required to react with the lead (and silver) sulphide according to the chemical equations given above. I have also found it advantageous to use a small amount of acid with the ferric chloride in order to reduce the hydrolysis of the ferric chloride. This treatment brings the lead (and silver) into solution. This hot pregnant solution is then separated from the ore (preferably by filtration) and cooled and the precipitated lead chloride separated from the cold solution. This lead chloride is then electrolyzed and the chlorine used to convert the ferrous into ferric iron so that the solution may be used for the treatement of more ore. This electrolysis may be carried out by melting the $PbCl_2$ and electrolyzing it, giving melted lead and chlorine. The chlorine is then absorbed by the ferrous salt solution in any suitable absorption apparatus. It is advantageous to have some salt present with the molten lead chloride in order to reduce the melting point and lower the resistance of the molten bath.

The lead chloride may also be electrolyzed in a concentrated salt solution, the lead being precipitated as a sponge and the chlorine changing the ferrous iron to ferric at the anode. The electrolysis should preferably be conducted in a cell with a diaphragm to prevent the reduction of the ferric chloride at the cathode. A comparatively low E. M. F. may be used in this electrolysis as the reactions at the anode give back a considerable portion of the energy used at the cathode. Theoretically the voltage should be approximately one-half volt, but this cannot of course be realized in practice due to the resistance of the solution and diaphragm. My preferred method of carrying out the electrolysis in the solution is to electrolyze the warm solution containing the lead in a cell with a porous diaphragm. The pregnant solution is allowed to flow into the cathode compartment where the lead is deposited, and then into the anode compartment where the ferrous chloride is changed to ferric chloride and the ferric solution then used to treat more galena ore.

In the annexed drawings I have shown various forms of apparatus applicable to the steps of my process, in which,—

Fig. 1 is a general diagrammatic view of the method and an apparatus by which the process may be practiced;

Figs. 2, 3 and 4, are views showing an apparatus employed for heating and cooling the solutions and for the absorption of the chlorine; and Figs. 5 and 6 are views illustrating a modified form of the apparatus.

Referring to Fig. 1, the full line O indicates the comminuted ore; the dot and dash line P the pulp (mixture of solution and ore); the broken line S the solution; the broken line W the wash water; the broken line W. S., the wash solution; the dotted line Cl. the chlorine; the full line $PbCl_2$ the lead chloride; the full line Pb the lead bullion. The apparatus shown consists of a series of small mechanical agitators 1 preferably made of porcelain or acid proof earthenware; a filter 2 made of similar acid proof material and using tubes of porous alundum as the filtering medium (tubes of filtros or porous porcelain, etc., may be used but I have found the alundum tubes a very excellent filtering medium for this work). A reducing tank 3 made of porcelain or earthenware; a precipitating tank 4, preferably made of acid proof tile of the "zinc box" type used in cyanide and copper precipitation work; a cooler 5, consisting of a special form of air cooler described later. The cooler may be made of wood construction if desired as the solutions coming from the precipitator or in a reduced condition and not as corrosive, as in the earlier stages of the process; a settling tank 6 which may also be of wooden construction; an electrolytic furnace 7 suitable for the electrolysis of the molten $PbCl_2$; a special absorption apparatus 8 for the absorption of the Cl in the mill solution, of acid proof tile or wooden construction, described later; a special heating device 9 for heating the mill solution by direct contact with hot gases.

The special pieces of apparatus, 5, 8, 9, for heating and cooling the solutions and for absorbing the chlorine are constructed on the same general principle. The general method of construction is indicated in Figs. 2, 3, 4 and 5. The method of handling the solutions in each of these is as follows:

The solution is made into a spray by bringing the surface of a rapidly revolving cylinder 10 into contact with the surface 11 of the solution so that the cylinder dips slightly into the liquid (from $\frac{1}{16}$ to $\frac{1}{4}''$ according to the density of the spray desired). This operation is conducted in an enclosed passage surrounded by a suitable housing 12, in the lower part of which the solution is contained and the upper part 13 of which is filled with the spray thrown by the cylinder 1. The gases to be brought into contact with the spray of solution are passed through the spray enclosed in the housing 12. For example, for heating the solution, hot gases from a furnace or stove are passed through the spray; for cooling the solution, cold air is passed through the spray, cooling it by evaporation; for the absorption of chlorine or acid gases, these gases are passed through the spray. For acid absorption and to secure the highest efficiency in heating and cooling a counter current flow of gases and solution is preferable. This counter current flow is secured by passing the gases and solution through the tunnel or housing 12 in opposite directions, as shown in Figs. 2, 3 and 4.

Fig. 2 shows a longitudinal vertical section of the apparatus and Figs. 3 and 4 vertical cross sections showing different shapes of housing. The circular housing 12 shown in Fig. 3 does not obtain the benefit of the full fan of spray thrown by the cylinder, whereas the fan shaped housing 12 of Fig. 4 secures the benefit of a larger part of the fan of spray. This type of housing is also especially suitable for construction of acid proof brick. The choice of the style of housing will depend on the volume of gas to be handled and the material of construction, a number of sections of housing may be connected in series to secure as long a period of contact between gases and solution as is desired. In this case the flow of gases and the flow of solution are parallel to the axis of the cylinder spray 1, but in opposite directions, the gases entering at 14 and leaving at 15 and the solutions entering at 16 and leaving at 17.

For cases in which it is not desired to secure such an efficient counter current, as just described, the arrangement shown in Figs. 5 and 6 may be used. Fig. 5 shows a vertical section of one of the housings of this apparatus, which is similar to that shown in Fig. 4 except that the gases in this case pass through the housing 12 and spray transversely to the axis entering at one side 18 and leaving at the other 19. In order to secure a counter current effect in this type of apparatus a number of such sections of housing are placed side by side so that the cylinders are end to end, and the gases flow through successively, through the housings as shown in Fig. 5, which is a plan view of this arrangement, as shown by the arrows 20 entering at 18 and leaving at 19. The solution enters at 21 and flows through each housing parallel to the axis of the cylinders 1 leaving at 22. This arrangement of my apparatus has some advantages in construction for work with acid solutions.

The process is carried out in a general way as follows: The hot salt solution 3 containing the ferric chloride and the comminuted (O) ore are continuously fed into the first of the series of agitators 1, in suitable relative proportions and passed through the agitators to the filter 2 where the hot pregnant solution is removed and the residue of ore washed with the wash water (W). From the filter 2 the pregnant solution passes through the reducing box 3 which contains galena (or lead if desired), sufficient time being allowed in this box to reduce the excess of ferric chloride remaining in the solution. From the reducer 3 the hot pregnant solution flows to the precipitation box 4 in which the gold and silver are first precipitated with copper (or lead, if desired) and the copper with lead. From this precipitator the hot solution flows to the cooler 5, being first mixed with the wash solution from the filter to cool and dilute the solution so as to secure as complete a precipitation as possible. In passing through the cooler the solution is cooled by a current of cold air blown through the spray of solution, as previously described. This results in a considerable evaporation of water from the solution. The cold solution carrying the precipitated $PbCl_2$ flows to the settling tank 6 and the lead chloride is settled out. The lead chloride is dried and electrolyzed in a molten condition in the electrolytic furnace 7 giving molten lead and chlorine. The chlorine (C) is absorbed in the cold barren mill solution in the absorber 8 by being brought into contact with the solution spray, as previously described, converting the ferrous chloride to ferric chloride. From the absorber 8 the solution is passed through the heater 9 and is heated by bringing the solution spray into contact with hot gases from a furnace or grate, as previously described. The position of the absorber 8 and heater 9 may be reversed, if desired, absorbing the hot chlorine from the electric furnace 7 in the hot solution. The heating of the solution with the hot gases in the heater 9 results in a considerable evaporation of water from the solution. As previously stated this loss is made up by the wash water used in washing the lixiviated ore.

The tailings (T) discharged from the filter 2 may be treated by the flotation process to recover any pyrite or chalcopyrite which may contain gold and silver.

Though the apparatus described disclose my preferred forms, others may be used, if desired.

From the foregoing it will be apparent that the process is subject to many variations in the details of the manner of its application, but that the main features of the process are, first, the dissolving of the galena in a hot salt solution containing ferric chloride whereby the ferric chloride is reduced to ferrous chloride, and second, the electrolysis of the lead chloride to get lead and chlorine and the use of this chlorine to convert the ferrous chloride to ferric chloride so that the latter may be used in the treatment of more ore.

By my process it is possible to make a practically complete recovery of the lead and sulphur and silver and gold, and in many cases the copper, from galena ores. In the process the silver and gold is preferably precipitated, first, with copper, the copper with lead, and the lead by one of the methods previously described. In most ores all the gold and silver and copper, except that which is locked up in the pyrite or chalcopyrite which is present in the ore are easily recovered by my process.

As before mentioned the many variations in the details of methods of application of the process are too numerous to be given in the scope of a patent application, and do not therefore desire to be limited by the brief descriptions given, but by the appended claims.

This application is a division of my application Serial No. 327,401, filed September 30, 1919.

Having described my process what I claim and desire to patent is:

1. The process of treating ores containing galena which consists in treating said ores with a hot concentrated salt solution containing ferric chloride, and thereby dissolving the lead as a chloride, and separating the hot solution containing the lead chloride from the ore, and cooling said solution, and thereby precipitating lead chloride from said solution.

2. The process of treating ores containing galena which consists in treating said ores with a hot concentrated salt solution containing ferric chloride and thereby dissolving the lead as a chloride and freeing metallic sulphur and reducing the ferric iron in solution to the ferrous condition and separating the pregnant solution containing the lead from remainder of the ore and cooling said solution and thereby precipitating lead chloride therefrom, and electrolyzing the said lead chloride to recover the metallic lead and chlorine therefrom and adding said chlorine to the solution which has been reduced by above said treatment and thereby changing the ferrous iron to the ferric condition in said solution and using said solution in the treatment of more ore.

In testimony whereof I have signed my name to this specification.

NIELS C. CHRISTENSEN.